US010718716B2

(12) United States Patent
Wang et al.

(10) Patent No.: US 10,718,716 B2
(45) Date of Patent: Jul. 21, 2020

(54) PORTABLE LASER INDUCED BREAKDOWN SPECTROSCOPY SYSTEMS

(71) Applicant: THERMO SCIENTIFIC PORTABLE ANALYTICAL INSTRUMENTS INC., Tewksbury, MA (US)

(72) Inventors: Peidong Wang, Carlisle, MA (US); Rong Sun, Winchester, MA (US); Brendan Falvey, Wilmington, MA (US); Haowen Li, Lexington, MA (US); Yu Shen, Waltham, MA (US); Michael E. Dugas, Londonderry, NH (US)

(73) Assignee: THERMO SCIENTIFIC PORTABLE ANALYTICAL INSTRUMENTS INC., Tewksbury, MA (US)

( * ) Notice: Subject to any disclaimer, the term of this patent is extended or adjusted under 35 U.S.C. 154(b) by 0 days.

(21) Appl. No.: 16/421,888

(22) Filed: May 24, 2019

(65) Prior Publication Data

US 2019/0310201 A1    Oct. 10, 2019

Related U.S. Application Data

(62) Division of application No. 15/213,512, filed on Jul. 19, 2016, now abandoned.
(Continued)

(51) Int. Cl.
*G01N 21/71* (2006.01)
*G01J 3/02* (2006.01)
(Continued)

(52) U.S. Cl.
CPC ............ *G01N 21/718* (2013.01); *G01J 3/027* (2013.01); *G01J 3/0213* (2013.01); *G01J 3/0237* (2013.01);
(Continued)

(58) Field of Classification Search
CPC ...... G01J 3/0213; G01J 3/0237; G01J 3/0264; G01J 3/027; G01J 3/0272; G01J 3/0286;
(Continued)

(56) References Cited

U.S. PATENT DOCUMENTS 6,407,811 B1   6/2002   Snyder et al.
6,771,368 B1   8/2004   Chadwick
(Continued)

FOREIGN PATENT DOCUMENTS

CN         1480722 A     3/2004
CN       102426160 A     4/2012
(Continued)

OTHER PUBLICATIONS

Final Office action dated May 11, 2018, to U.S. Appl. No. 15/213,512.
(Continued)

*Primary Examiner* — Violeta A Prieto
(74) *Attorney, Agent, or Firm* — William R. McCarthy, III

(57) ABSTRACT

An embodiment of a laser induced breakdown system is described that comprises a portable device that includes: a laser configured to produce a beam comprising a plurality of repeating pulses; a processor configured to open a data acquisition window after a delay period, wherein the delay period begins upon production of one of the pulses; one or more optical elements configured to direct the beam at a sample and collect emitted light from a plasma continuum; and an optical detector configured to produce a plurality of signal values from the emitted light from the plasma continuum collected during the data acquisition window, wherein the processor is configured to identify an element from the signal values.

14 Claims, 16 Drawing Sheets

Related U.S. Application Data

(60) Provisional application No. 62/194,493, filed on Jul. 20, 2015.

(51) Int. Cl.
  *G01J 3/10* (2006.01)
  *G01J 3/443* (2006.01)

(52) U.S. Cl.
  CPC ........... *G01J 3/0264* (2013.01); *G01J 3/0272* (2013.01); *G01J 3/0286* (2013.01); *G01J 3/10* (2013.01); *G01J 3/443* (2013.01); *G01N 2201/0221* (2013.01); *G01N 2201/127* (2013.01)

(58) Field of Classification Search
  CPC .......... G01J 3/10; G01J 3/443; G01N 21/718; G01N 2201/0221; G01N 2201/127
  See application file for complete search history.

(56) References Cited

U.S. PATENT DOCUMENTS

| | | | |
|---|---|---|---|
| 7,092,083 | B2 | 8/2006 | Chadwick et al. |
| 7,929,131 | B2 | 4/2011 | Lam et al. |
| 8,483,534 | B2* | 7/2013 | Tudury ................... G06F 30/00 385/124 |
| 8,842,703 | B1 | 9/2014 | Zhang ..................... H01S 3/005 372/25 |
| 9,080,982 | B1* | 7/2015 | Asprey .................. G01N 21/68 |
| 2004/0051867 | A1 | 3/2004 | Brestel et al. |
| 2006/0119846 | A1 | 6/2006 | Fichet et al. |
| 2006/0153570 | A1 | 7/2006 | Nelson et al. |
| 2007/0030176 | A1 | 2/2007 | Sanchez-Olea et al. |
| 2007/0296967 | A1 | 12/2007 | Gupta et al. |
| 2009/0091745 | A1 | 4/2009 | Levesque et al. |
| 2010/0134083 | A1* | 6/2010 | Trescases .............. G04F 10/005 323/283 |
| 2010/0165813 | A1 | 7/2010 | Mc |
| 2014/0085631 | A1 | 3/2014 | Lacour et al. |
| 2014/0204377 | A1 | 7/2014 | Day et al. |
| 2015/0043600 | A1 | 2/2015 | Ying et al. |
| 2015/0103334 | A1 | 4/2015 | Quant et al. |
| 2015/0276587 | A1 | 10/2015 | Cowie et al. |
| 2017/0023484 | A1* | 1/2017 | Wang .................... G01J 3/0213 |
| 2018/0031660 | A1* | 2/2018 | Basha ................... A61B 5/055 |
| 2019/0033231 | A1* | 1/2019 | Connell ............... G01N 21/718 |

FOREIGN PATENT DOCUMENTS

| | | |
|---|---|---|
| CN | 102507512 A | 6/2012 |
| CN | 102661935 A | 9/2012 |
| CN | 102735658 A | 10/2012 |
| JP | 2013036779 A | 2/2013 |
| WO | WO-2008115287 A2 | 9/2008 |

OTHER PUBLICATIONS

First Notice of Correction dated Nov. 16, 2016, for CN Patent Application 201620762986.0.

First Office Action dated Oct. 9, 2018, for CN Patent Application 201610570751.6.

Non-Final Office action dated Jan. 18, 2019, to U.S. Appl. No. 15/213,512.

Non-Final Office action dated Nov. 8, 2017, to U.S. Appl. No. 15/213,512.

Second Office Action dated Sep. 2, 2019, for CN Patent Application 201610570751.6.

Li, "Quantitative Analysis of Metal Elements Using LIBS and its Relevant Impact Factors," China Doctoral Dissertation Full-text Database Basic Science Issue 5, 2013, pp. 89-91.

* cited by examiner

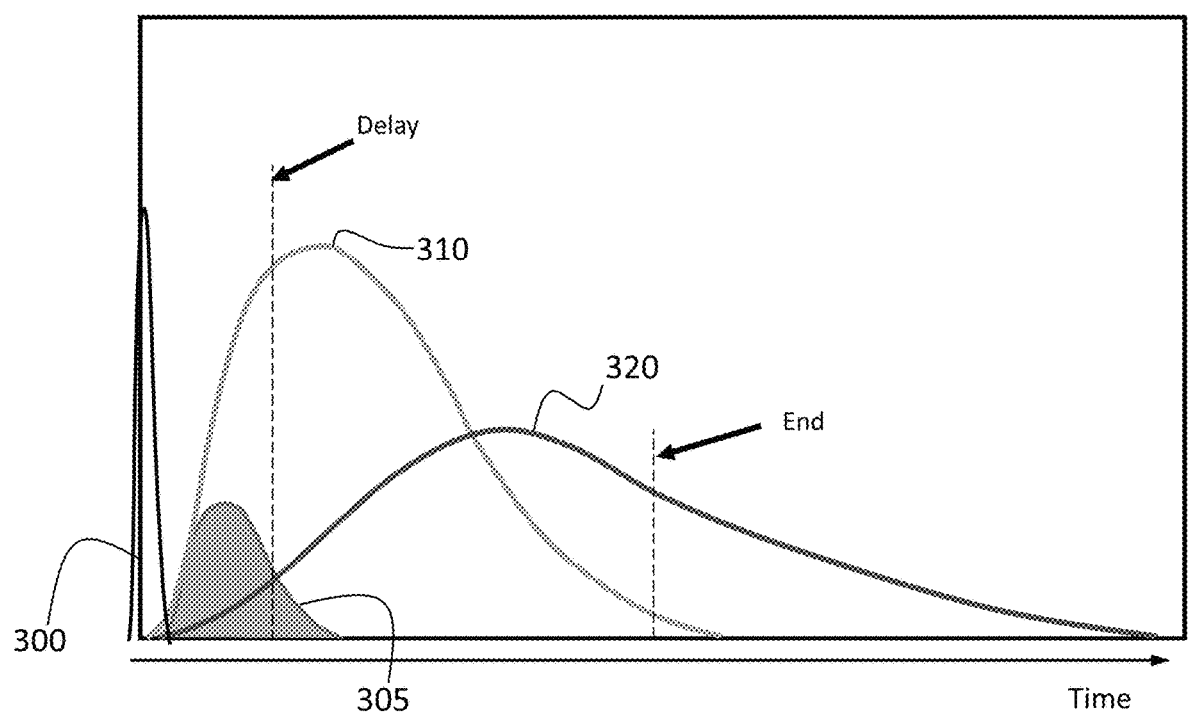

PORTABLE LASER INDUCED BREAKDOWN SPECTROSCOPY SYSTEMS

CROSS-REFERENCE TO RELATED APPLICATION

This application is a divisional of and claims priority from U.S. patent application Ser. No. 15/213,512, filed Jul. 19, 2016, which claims priority from U.S. provisional patent application Ser. No. 62/194,493 for "Portable Laser Induced Breakdown Spectroscopy Systems" by Peidong Wang, et al., filed Jul. 20, 2015, the entire disclosure of each is incorporated herein by reference.

FIELD OF THE INVENTION

The invention relates to hand held Laser Induced Breakdown (LIBS) devices and methods for their use.

BACKGROUND OF THE INVENTION

It is generally appreciated that elemental analysis techniques have important applications to determine the elemental composition of a material in various forms. Elemental analysis techniques range from destructive (e.g.—material is destroyed in testing) to semi-destructive (e.g.—material is sampled or surface damaged) to fully non-destructive (e.g.—material is left fully intact). One view of elemental analysis is via the periodic chart to define which elements can be detected via a particular technique or device design. There are often challenges with certain elements due to interfering signals, weak signals, or the inability to cause atomic excitation. This category of techniques can include what are referred to as Inductively Coupled Plasma-Atomic Emission Spectroscopy (e.g. ICP-AES), ICP-Mass Spectrometry (e.g. ICP-MS), Electrothermal Atomization Atomic Absorption Spectroscopy (e.g. ETA-AAS), X-Ray Fluorescence Spectroscopy (e.g. XRF), X-Ray Diffraction (e.g. XRD), and Laser Induced Breakdown Spectroscopy (e.g. LIBS). Limits of detection are a key performance specification of any technique or instrument. Elemental analysis may be either qualitative (e.g. easier) or quantitative (e.g. more difficult) and often requires calibration to known standards.

As described above, the periodic table is often used to define the elements which a system can detect and quantify. A key element of interest in the analysis of metals is Carbon which is known as a "light" element according to the periodic table. For example, the carbon content of many steel compositions defines the material properties and compatibility of a particular composition with other metals. It is generally appreciated that XRF devices and in particular portable instruments are not able to reliably detect and quantify light elements such as the carbon content of a material. The defining characteristic of low carbon steel (used extensively to transport chemicals in piping) is the presence of approximately 300 ppm of carbon which would require a limit of detection of less than 100 ppm to reliably quantify (limit of quantification, LOQ, or ~3 times LOD). Often these materials need to be tested at the point of use to confirm suitability for the purpose.

Laser Induced Breakdown Spectroscopy is an atomic emission spectroscopy technique which uses laser pulses to induce excitation. The interaction between the focused laser pulses and the sample creates plasma composed of ionized matter. Plasma light emissions can provide spectral data regarding the chemical composition of many different kinds of materials. LIBS can provide an easy to use, rapid, and in situ chemical analysis with adequate precision, detection limits, and cost. Importantly, LIBS can very accurately detect and quantify the light elements that other technologies cannot.

Laser interactions with matter are governed by quantum mechanics which describe how photons are absorbed or emitted by atoms. If an atom absorbs a photon one or more electrons move from the ground state to a higher energy quantum state. Electrons tend to occupy the lowest possible energy levels, and in the cooling/decay process the atom emits a photon. The different energy levels of different atoms produce different photon energies for each kind of atom, with narrowband emissions due to their quantization. These emissions correspond to the spectral emission lines found in LIBS spectra and their features and their associated energy levels are well known for each atom.

There are three basic stages in the plasma life time. The first stage is the ignition process which includes the initial bond breaking and plasma formation during the laser pulse. This is affected by the laser type, laser power, and pulse duration. The second stage in plasma life is the most critical for optimization of LIBS spectral acquisition and measurement because the plasma causes atomic emission during the cooling process. After ignition, the plasma will continue expanding and cooling. At the same time, the electron temperature and density will change. This process depends on ablated mass, spot size, energy coupled to the sample, and environmental conditions (state of the sample, pressure, etc.). The last stage of the plasma life is not interesting for LIBS measurements. A quantity of ablated mass is not excited as vapor or plasma, hence this amount of material is ablated as particles and these particles create condensed vapor, liquid sample ejection, and solid sample exfoliation, which do not emit radiation. Moreover, ablated atoms become cold and create nanoparticles in the recombination process of plasma.

In general there is a desire to move analytical techniques from the laboratory to the field at the point of use by using devices that are easily portable and supportable with a minimum of additional requirements. There are often significant costs and technical challenges associated with laboratory testing, in particular when there are significant time delays between the sampling and the test result, or if sampling itself presents an issue. Example markets include in-process pipe testing, scrap metal sorting, incoming material inspection, and positive material identification. Portable XRF devices have been very successful in these markets but have technical limitations in certain applications such as with the detection of light elements as described above. Further, while it is appreciated that Optical Emission Spectroscopy (e.g. OES) devices can detect light elements it is also known to be very challenging to execute in a portable form.

There are many challenges associated with bringing technologies from the laboratory to the field. In a laboratory setting, one can usually control many of the analysis variables and perform various sample preparation steps to get an accurate and repeatable result in often "ideal" conditions. Bringing the technology to the field, in particular to outdoor and often remote locations, introduces a host of variables that cannot be completely controlled. Most importantly the operating environment can vary widely including temperatures ranging from −5 to 50° C. and beyond. Additionally, sample preparation may be limited by the other tools available in the field and the technical skill of the operator. The portable instruments need to be rugged, easy to use, and minimize the amount of user intervention to get repeatable results.

Without the ability to control all of the analysis variables like in a laboratory setting, it becomes important that the portable instrument is able to operate effectively over a broad range of variables that may occur in a real field setting. The calibration of the instrument may typically occur at the factory in controlled conditions, and various factors can be intentionally altered (temperature, pressure, sample types, power settings). But, it is unlikely that every possible condition could be envisioned as well as impractical to calibrate for all potential operating conditions that may occur in the field during manufacture. Further, calibration processes typically cannot compensate for certain changes in operation due to environmental conditions, performance changes over a lifetime of use, etc. For example, the power output of a laser may vary based on a number of factors that include temperature, decrease caused by usage over time, or other factors.

Therefore, it is appreciated that there is a strong need for a portable LIBs system and methods that enable adjustment to operating conditions in order to compensate for many of the uncontrolled variables and give a result comparable to those found in a laboratory environment.

SUMMARY

An embodiment of a laser induced breakdown system is described that comprises a portable device that includes: a laser configured to produce a beam comprising a plurality of repeating pulses; a processor configured to open a data acquisition window after a delay period, wherein the delay period begins upon production of one of the pulses; one or more optical elements configured to direct the beam at a sample and collect emitted light from a plasma continuum; and an optical detector configured to produce a plurality of signal values from the emitted light from the plasma continuum collected during the data acquisition window, wherein the processor is configured to identify an element from the signal values.

In some embodiments the portable laser induced breakdown system further comprises a second optical detector that detects an actual pulse that signals the beginning of the delay period and/or a temperature detector that detects ambient temperature, wherein the controller modifies duration of the delay period using the ambient temperature.

Also in some embodiments, the portable laser induced breakdown system further comprises an attenuator element that modifies a power level of the beam. Further some embodiments also include a temperature detector that detects ambient temperature and a processor that modifies the relative position of the variable filter with the beam using the ambient temperature.

In addition, an embodiment of a method is described that comprises identifying an element using a portable device that performs a method comprising: producing a beam from a laser comprising a plurality of repeating pulses; directing the beam at a sample; collecting emitted light in response to the beam; opening a data acquisition window after a delay period, wherein the delay period begins upon production of one of the pulses; producing a plurality of signal values from the emitted light collected during the data acquisition window; and identifying the element from the signal values.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 120 appears first in FIG. 1). All of these conventions, however, are intended to be typical or illustrative, rather than limiting.

FIG. 3 is a simplified graphical representation of one embodiment of a continuum of LIBs plasma generated by laser pulse;

Like reference numerals refer to corresponding parts throughout the several views of the drawings.

DETAILED DESCRIPTION OF EMBODIMENTS

As will be described in greater detail below, embodiments of the described invention include LIBS systems and methods for addressing laser power variations that occur in applications with portable devices. More specifically, embodiments include LIBS platforms enabled to attenuate the power of a beam emitted from a laser source in order to compensate for changes in laser power output. Also, the described embodiments include LIBS platforms enabled to modulate the initiation of a "delay period" used to begin a window of data acquisition when the noise floor has been reduced.

Some or all of the embodiments described herein may include one or more elements for operational control of a portable LIBS device. For example, embodiments may include one or more processor or controller elements that execute control logic, data acquisition, and/or data processing operations for the portable LIBS device. Embodiments may also include readable and writeable memory devices that store data that may include reference material data, calibration data, sample material data, performance metrics, etc. Also in the described embodiments, LIBS devices may include one or more optical elements for directing a beam to a sample and collecting light from the sample as well as one or more detection elements (e.g. CCD, photodiode, etc.) that receive light collected from the sample and in some embodiments process the collected light into signals that can be interpreted by the processor or controller elements.

Figure 1:
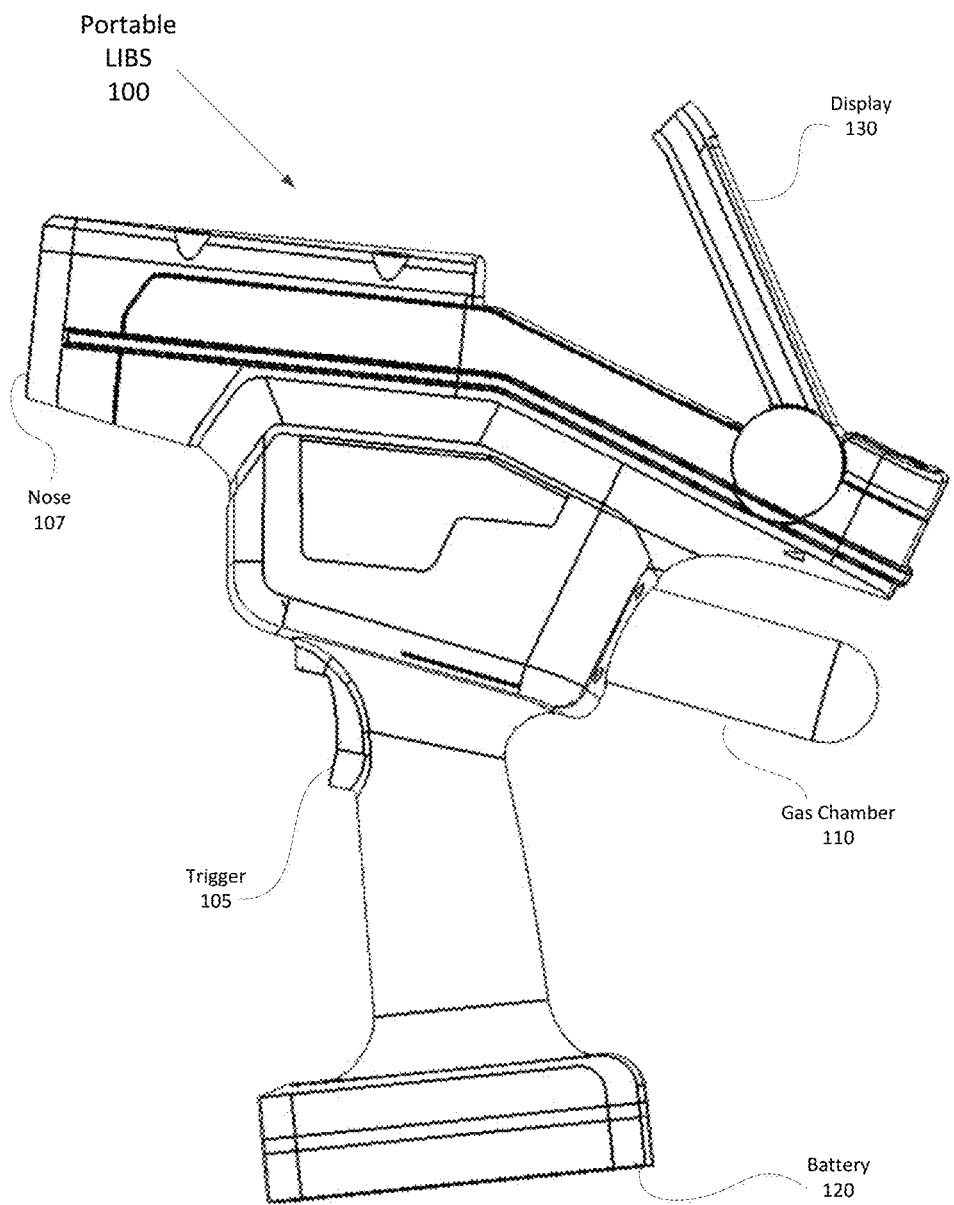
FIG. 1 is a simplified graphical representation of one embodiment of a portable LIBS instrument.

An example of portable LIBS 100 is illustrated in FIG. 1 that includes trigger 105 that a user may employ to initiate a laser to fire and to begin data acquisition processes, and nose 107 constructed and arranged to interface with a sample and includes optical elements to direct laser pulses at the sample and acquire spectral information in response to the laser pulses. FIG. 1 also illustrates gas chamber 110 that is a storage element used to provide a gas through nose 107 which creates a microenvironment at an interrogation region of the sample, battery 120 that provides a power resource for LIBS 100, and display 130 that provides the user with useful information that includes process and/or result information. Also, embodiments of LIBS 100 include a housing constructed of a lightweight, durable, and rigid material that defines an internal space within LIBS 100 where components may be arranged.

Figure 2:
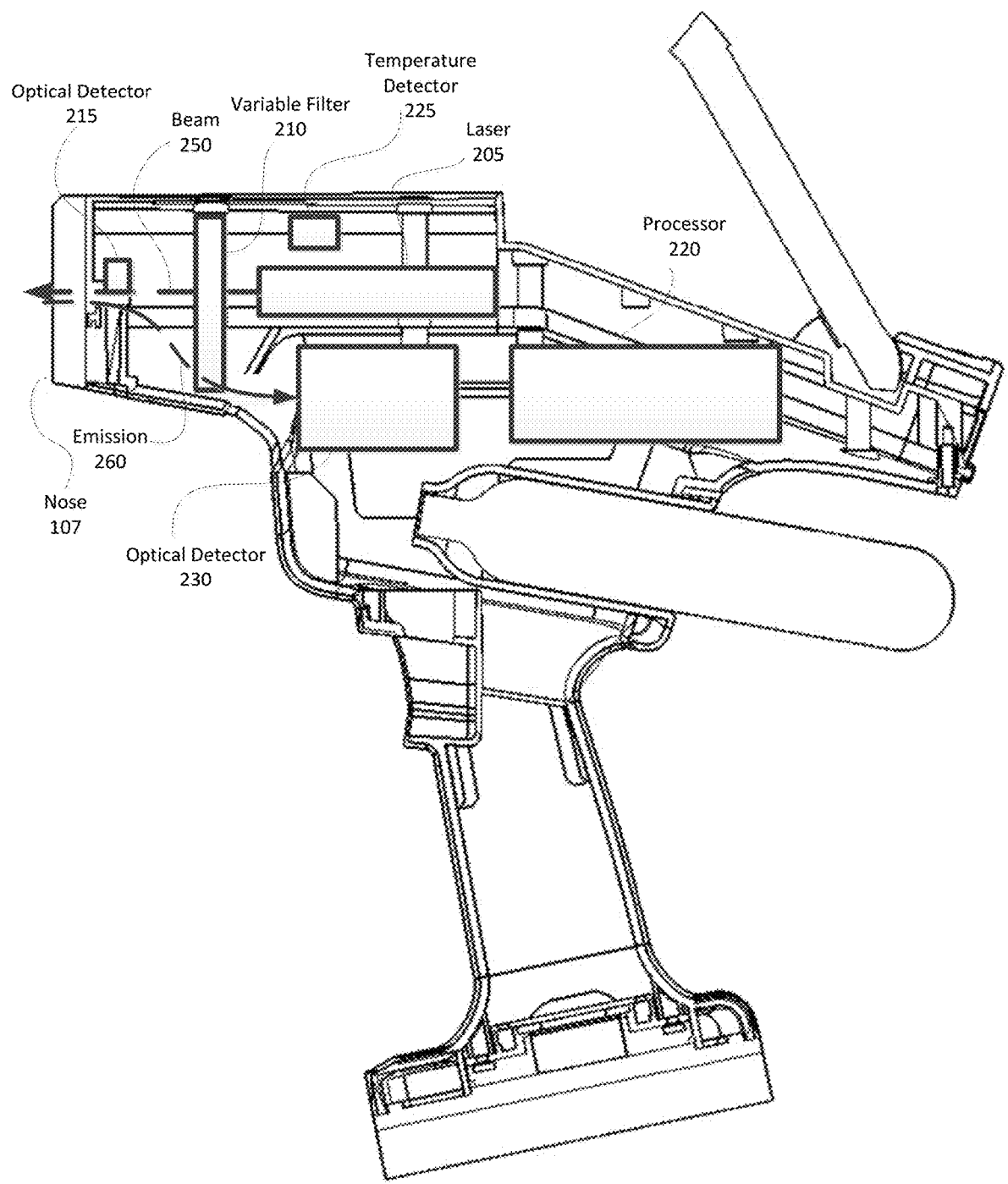
FIG. 2 is a simplified graphical representation of one embodiment of a cutaway view of the portable LIB S instrument of FIG. 1.

An example of a cutaway view of portable LIBS 100 is also provided in FIG. 2. For example, FIG. 2 includes processor 220, optical detector 215, temperature detector 225, and laser 205 that provides beam 250 through optical elements and to a sample via nose 107. Light emission 260 is also collected by optical elements and directed to optical detector 230. In the present example, the optical elements may include typical elements known in the art such as lenses, mirrors, fibers, etc. Optionally, some embodiments of LIBS 100 may include variable filter 210 as will be described in greater detail below. It will be appreciated that the embodiments illustrated in FIG. 2 are exemplary and should not be considered as limiting, and that components such as optical elements (e.g. lenses, mirrors, fibers, etc.), memory, and other components not illustrated are considered to be within the scope of the described embodiments.

FIG. 3 provides an illustrative example of relative optical signal intensity of a typical continuum of LIBS plasma generated by laser pulse 300 at time 0. Laser pulse 300 initially produces highly ionized plasma (also referred to as a super continuum plasma) that generally emits a high level of background intensity 305 which makes it difficult to effectively identify individual element signatures. In typical embodiments background intensity 305 decays more quickly than ionic intensity 310 or atomic intensity 320 through electron-ion recombination (e.g. atomic transitions) so that after a period of nanoseconds (ns) to microseconds (μs) subsequent to pulse 300 (e.g. length of period depending on specific characteristics of LIBS 100 and/or conditions). The amount of time from laser pulse 300 until the start of data acquisition is sometimes referred to as a "delay period" ($\tau_d$) represented as a point in time noted as "Delay" in FIG. 3. In the example of FIG. 3, a data acquisition window opens after the delay period to obtain the elemental information contained in the spectra and maximize the ratio of signal of interest/unwanted signal. In the present example, the LIBS 100 instrument acquires signal intensity data for a specified amount of time that may be referred to as a "window" illustrated in FIG. 3 as the time between the "Delay" line and the "End" line. It is typically desirable that the data acquisition window closes when the signals from ionic intensity 310 or atomic intensity 320 have decayed below a threshold level. It will also be appreciated that different delay periods ($\tau_d$) may be used and that the data acquisition window may vary, but in general may not be an amount of time that is substantially greater than the delay period (e.g. $>>10\tau_d$).

Elements present in the sample can be qualitatively identified by their spectral lines detected from the sample. For quantitative analysis the detected intensities for the elements are compared to intensities on a calibration curve that is typically a substantially linear relationship between the element response to the laser pulse and the concentration range of the element. The slope of the substantially linear calibration curve represents the change of signal for a given incremental change in concentration. Those of ordinary skill in the art appreciate that the signal intensity is influenced by the laser power and other factors. Thus changes in the laser power influence the slope and thus accuracy of quantitative result.

One of the key variables in performing an accurate LIBS analysis is the amount of laser power deposited on the sample surface. As those of skill in the art appreciate, the level of laser power has a direct effect on the plasma characteristics and in turn the optical signal that is generated. An approach typically employed in laboratory settings is to use what is referred to as an active Q-switched laser so that the power can be modulated for consistency. As those of ordinary skill in the art appreciate the technique of "Q-switching" (also referred to as "giant pulse formation") generally refers to the production of a pulsed beam by a laser where the pulses typically exhibit significantly higher peak power than can be produced by a laser operating in a continuous output mode. There are two general categories of Q-switched laser, the first is referred to as an "active" version that includes some sort of mechanical control (e.g. a shutter, wheel, mirror, etc.) positioned within the laser cavity that enables external control of the pulse repetition rate. The second is referred to as a "passive" version that employs an absorber material in the laser cavity (e.g. an ion doped crystal) that does not generally allow for direct control of the pulse repetition rate and typically results in increased "jitter" (e.g. a variation in pulse periodicity and power level).

In the case of active Q-switch lasers, the pulse repetition rate of the laser can be precisely determined beforehand and therefore proper signal acquisition can also be pre-determined. However, active Q-Switch lasers are significantly more expensive, larger than passive versions, complex to construct, sensitive to the surrounding environmental conditions, and need a high voltage power input to activate the Q switch. For applications with LIBS 100 it is typically desirable to use a passive Q-switch laser as opposed to an active Q-switch laser due to the smaller size, lower cost, ease of operation, increased durability, and lower power consumption requirements. For example, a pulsed Nd:YAG laser that operates at about 1064 nm may be employed in embodiments of LIBS 100.

Particularly important for applications with LIBS 100, changes in the environment can cause calibration curve variations (e.g. to the slope of the calibration curve) which can produce a substantial effect on the data acquired. One significant factor is a change in the ambient temperature in which portable LIBS 100 instrument operates. Temperature differences cause a corresponding laser power change of a certain magnitude relative to the degree of change in temperature from the temperature used to produce a calibration curve. For example, even a relatively small change in ambient temperature for the laser or LIBS 100 instrument from a temperature to which a LIBS 100 instrument is calibrated can result in a significant change in laser power output. In many embodiments this occurs without instructional or other input from the control elements in LIBS 100 since the laser power in a passively Q-switched laser system cannot be easily changed. Some embodiments of LIBS 100 may include one or more temperature sensors to measure the temperature inside and/or outside of the instrument. For instance, in some embodiments temperature detector 225 is positioned within the housing of LIBS 100 that measures the temperature of the internal environment where laser 205 is located. The timing of the temperature measurement may occur at substantially the same time as a laser pulse fires from the laser, before the laser pulse fires from the laser, or after the laser pulse fires from the laser. Typically, there is a high degree of correlation between the degree of temperature change and the degree of laser power output change that enables accurate prediction.

Another change in the environment that can result in an effect on the data acquired from a sample includes gas pressure level and gas flow from LIBS 100 that creates a microenvironment in an interrogation region. For example, some embodiments of LIBS 100 benefit from use of an inert gas (e.g. Argon) to create a stable environment for plasma generation and detection. Variations in pressure and flow rate of the gas can have a destabilizing effect on the environment that affects the data acquired from the plasma. In the present example, LIBS 100 includes gas chamber 110 that acts as a reservoir of the inert gas that is delivered to that interrogation region associated with the sample via plumbing through nose 107. Also, nose 107 may include features that improve the retention of the inert gas in the interrogation region to reduce the fluctuation of gas concentration during the desired data acquisition period. Such features may include a "skirt" structure constructed from a flexible polymer or other flexible material that conforms to the surface contours of a sample and creates a seal separating the internal microenvironment from the external environment.

Figure 4A:
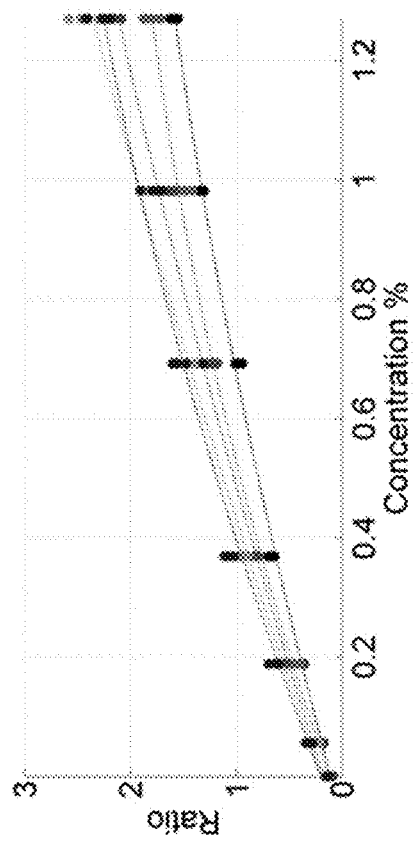
FIGS. 4A and 4B are simplified graphical representations of one embodiment of data depicting calibration curve or LOD changes vs. different time-delay.
Figure 4B:
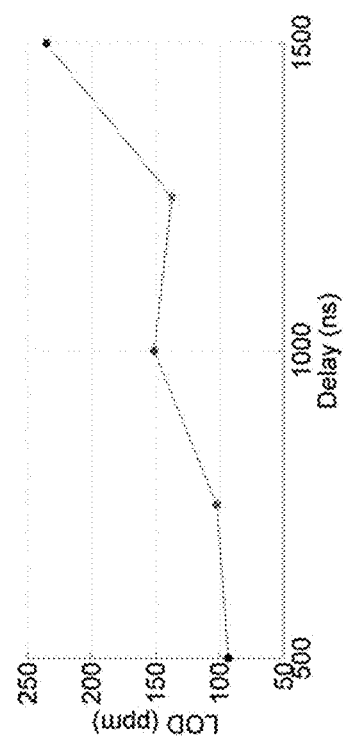

FIGS. 4A and 4B as well as 5A and 5B provide illustrative examples of data illustrating the effects of differences in delay period and temperature changes on a calibration curve. More specifically, FIG. 4A provides an example of calibration curve changes vs 5 different time-delay periods. The data is plotted as a ratio of the relative intensity detected to the intensity of a known reference peak on the Y axis (e.g. the ratio value of the intensity of the known reference peak is set at 1) to the percent concentration of a material on the X axis. In the example in FIG. 4A, the bottom calibration curve correlates to a 500 ns delay period with the remaining 4 time delay periods incrementing by 250 ns (e.g. 750 ns, 1000 ns, 1250 ns, and 1500 ns) with a progressive increase in the slope of each calibration curve with the corresponding increase in the delay period. Therefore, for the difference is greater at higher concentrations. FIG. 4B illustrates a progressive increase in the limit of detection (e.g. LOD) as the delay period progressively increases.

Figure 5A:
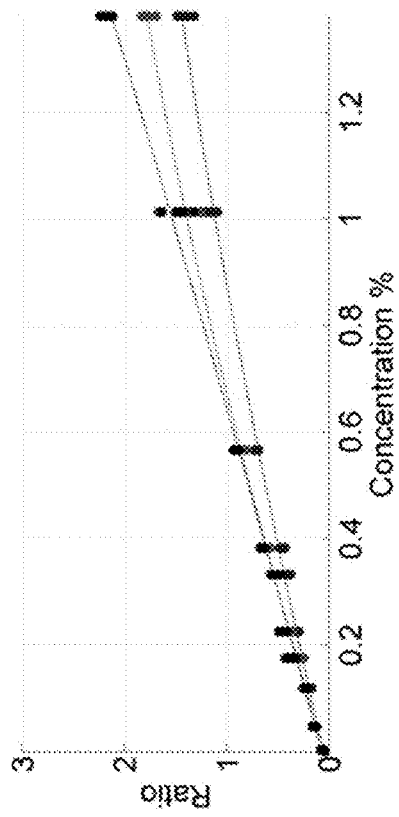
FIGS. 5A and 5B are simplified graphical representations of one embodiment of data depicting variation of calibration curve or LOD changes vs. different temperatures.
Figure 5B:
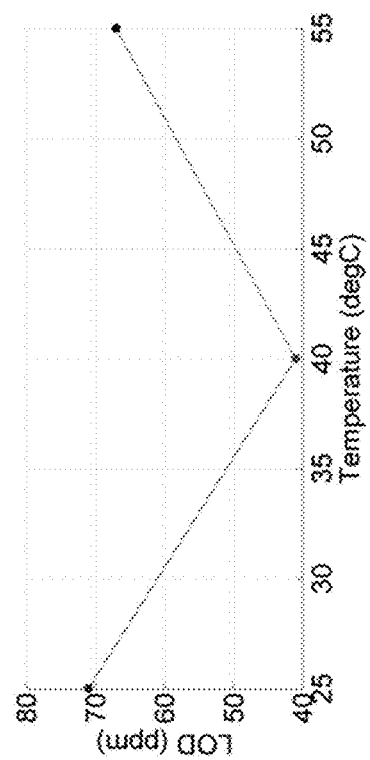

Similarly, FIG. 5A provides an example of variation of calibration curve changes with the same delay period at different temperatures (e.g. 25° C. bottom curve, 40° C. middle curve, and 55° C. top curve). Similar to FIG. 4A, the graph is plotted as a ratio of the relative intensity detected to the intensity of a known reference peak on the Y axis (e.g. the ratio value of the intensity of the known reference peak is set at 1) to the percent concentration of a material on the X axis. In the case of FIG. 5A, the progressive increase in the slope of each calibration curve occurs with the corresponding increase in the temperature. FIG. 4B illustrates a substantial degree of fluctuation in the limit of detection (e.g. LOD) as the temperature progressively increases with the lowest limit of detection occurring at 40° C.

In some embodiments, the predictable relationship between the time delay and the calibration curve can be employed to advantageously select a desired calibration curve that could include compensation for other factors affecting the calibration curve such as temperature. For example, the relationship between the calibration curve and the temperature is also very predictable and thus the accuracy of quantification of a material concentration can be improved by compensating for the effects of temperature on the calibration curve via an adjustment of the delay period and corresponding affect on the calibration curve. Thus, in the present example, a temperature measurement may be taken using temperature detector 225 or other temperature sensor at the substantially the same time that laser 205 fires. Processor 220 then calculates the difference in slope of the calibration curve at the detected temperature from the calibration temperature using the relationship of temperature to the calibration curves. Processor 220 further calculates a delay period to compensate for the temperature slope difference using the relationship of delay period to the calibration curves. The compensatory delay period may then be used to acquire the intensity data from the sample.

In the same or alternative embodiments, another timing data acquisition mode of the invention includes implementing a plurality of data acquisition "windows". In the described embodiment, each window can be optimized for each application and/or elemental signal in order to maximize the ratio of signal of interest/unwanted signal. Also, in some or all of the described embodiments the delay period triggering the start of an acquisition window and duration of time for each window may be dependent upon the characteristics of the analytical line. For example, an atomic line for Antimony (Sb) 259.804 nm (5.82 eV) and an ionic line for Iron (Fe) 259.872 nm (9.25 eV) cannot be optically separated using a standard acquisition window approach. In the present example, selection of an acquisition period for a window of 80-160 ps after the laser pulse results in a reduction of what may be referred to as the Background Equivalent Concentration (BEC) of Sb which allows for better detection limit for Fe.

Figure 6:
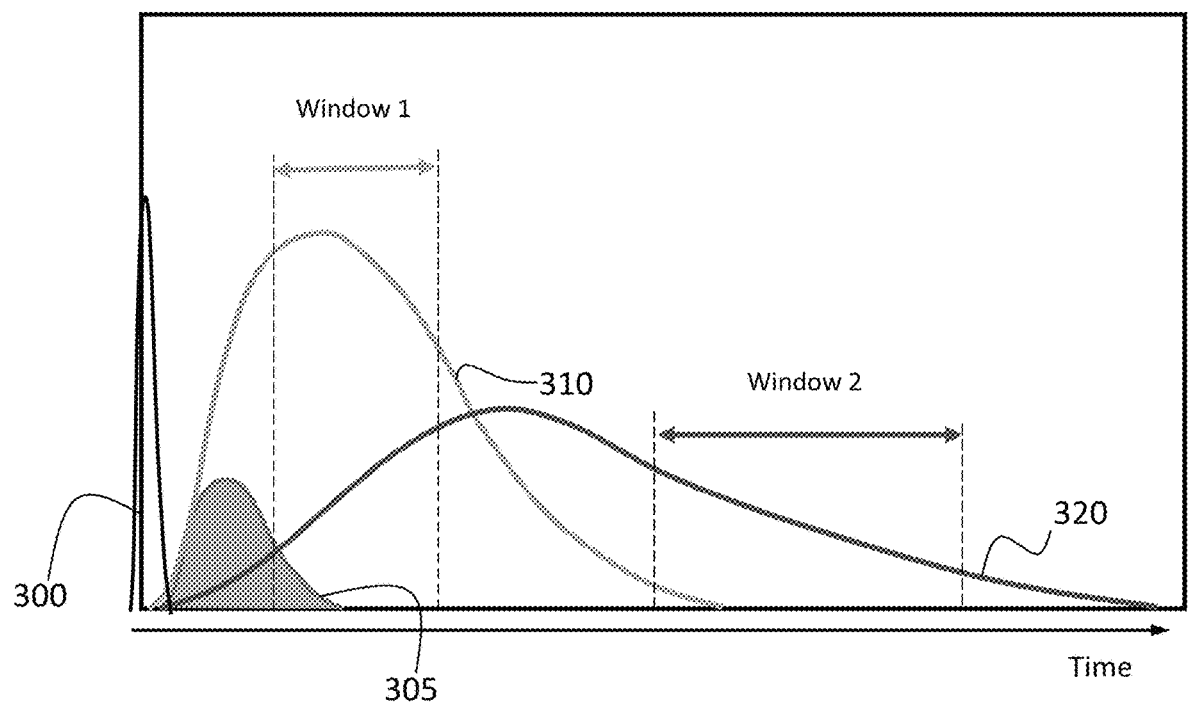
FIG. 6 is a simplified graphical representation of one embodiment of data acquisition using multiple windows.

FIG. 6 provides an illustrative example of one embodiment of multiple windows, the timing and duration of each may be optimized to maximize the ratio of signal of interest/unwanted signal for an application or element of interest. In the example of FIG. 6, Window 1 maximizes the data quality obtained from ionic intensity 310 and is timed to begin after background intensity 305 has substantially decayed and atomic intensity 320 is below its maximum. Similarly, Window 2 maximizes the data quality obtained from atomic intensity 320 and is timed to begin after ionic intensity 310 has substantially decayed and before atomic intensity 320 substantially decays. In the example of FIG. 6 Window 1 and Window 2 are separated from each other by some magnitude of time, however it will be appreciated that in some embodiments Window 2 may begin immediately after Window 1 ends. It will further be appreciated that in some embodiments Window 1 and Window 2 may overlap by some degree with Window 2 beginning at some time within the duration of Window 1.

In some embodiments, multiple delay periods may be used with each delay period shifted by some degree of time. Each delay period may be associated with a laser pulse or separate laser firing events. A shift may include moving the delay period to begin earlier or later by some degree relative to a previous delay period, typically on the order of 10-50 nanoseconds, and acquiring intensity information at each acquisition window associated with the shifted delay period. The resulting data may be used to optimize the signal used for subsequent calculations and which may be useful for "peak finding" applications. In the same or alternative embodiments, the delay period or series of shifted delay periods may be employed to identify a material or family of materials such as a matrix material that comprises one or more other materials of interest. For example, a particular delay period may be used to identify a matrix material in about 1 sec, and a second particular delay period may be used with a subsequent laser firing event to identify a material of interest in the matrix material.

Figure 7:
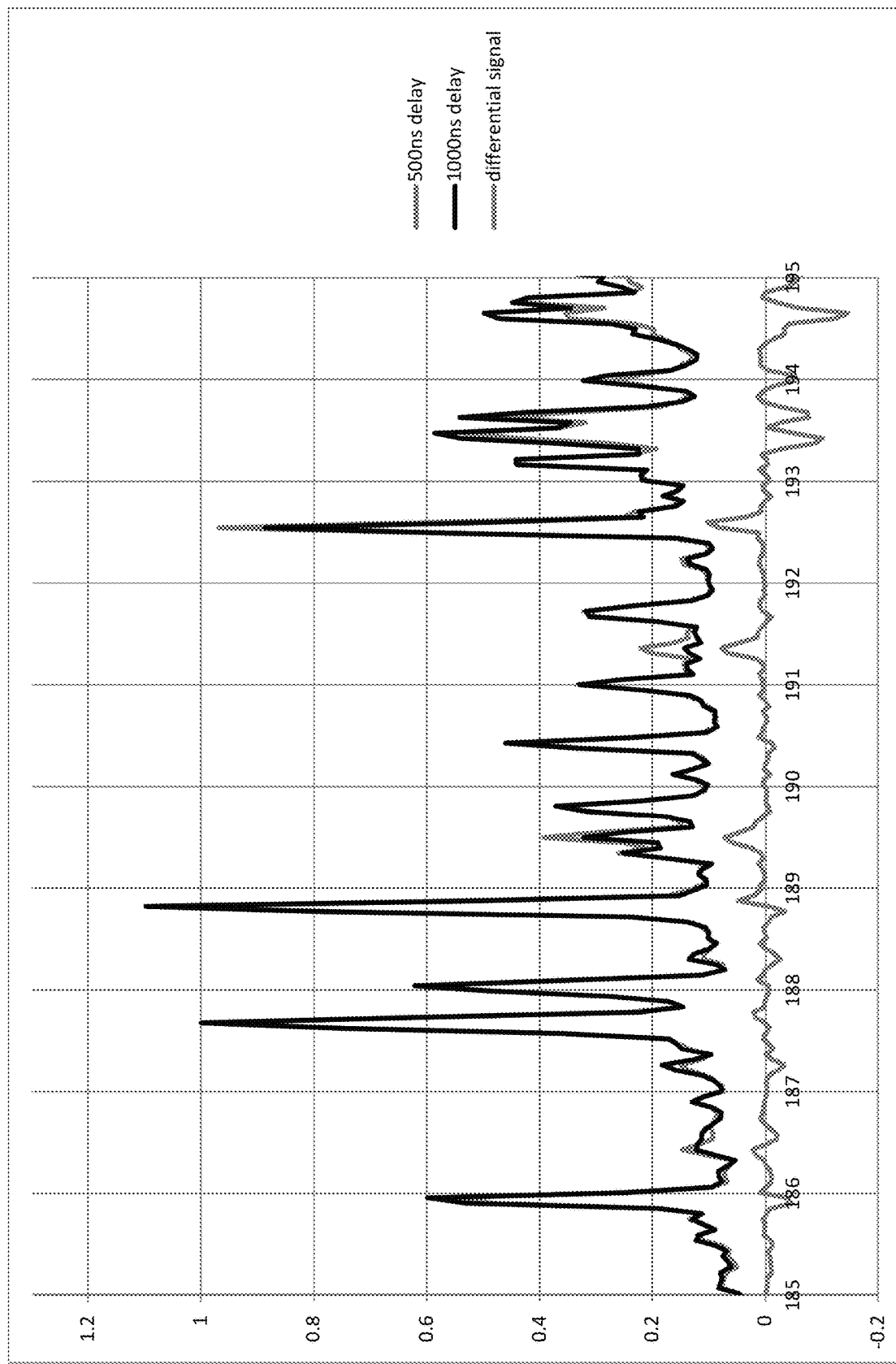
FIG. 7 is a simplified graphical representation of one embodiment of a differential spectrum from two delay periods.

Further, in some embodiments the data from two different delay periods may be used to find peaks that have differences or similarities in their lifetimes. As described above, the differential information is useful to select delay periods provide the desired emphasis on one or more selected peaks. Also, in some embodiments the differential spectrum could be used to identify minute contamination of a certain material of interest by another material or element. For example, FIG. 7 provides an illustrative example of a first normalized spectrum obtained using a 500 ns delay and a second normalized spectrum obtained using a 1000 ns delay. The bottom line illustrates a differential spectrum obtained by subtracting the values of the 1000 ns spectrum from the values of the 500 ns spectrum.

Also, embodiments of the presently described invention include approaches to address the effect of timing jitter with the laser in a LIBS 100 instrument. Typical implementations of LIBS instrumentation, such as those in laboratory environments, utilize active Q-switch lasers with very predictable laser pulse timing and thus accurately time the start of the delay period to coincide with the expected laser pulse timing. As described above, embodiments of LIBS 100 instruments may utilize a passive Q-switch laser that exhibits an undesirable timing jitter effect and thus one embodiment of the invention includes timing the start of the delay period (e.g. via an electronic shutter associated with a detector) to coincide with the timing of the actual laser pulse as opposed to coinciding with the timing of the expected laser pulse. In the described embodiments one or more detector elements may be incorporated into LIBS 100 that detect jitter effects associated with the passive Q-switch laser. The detector elements may include optical detectors that detect the timing of laser pulses and/or power output, or temperature detectors to detect that ambient temperature that can be correlated to an expected change in laser power output.

For example, a detector element such as detector 215 may be positioned to receive a signal from the optical path of beam 250 from laser 205. In the described example, detector 215 may communicate with processor 220 and include a fast photo diode employed to detect the time of firing of the actual laser pulse. Processor 220 applies the delay period using the timing of the actual pulse detected as opposed to the expected timing for the pulse. Thus, if the actual pulse is detected later by some degree from the expected timing of the pulse, then the delay period will begin at the timing of the actual pulse and will also include the degree of time difference. The time delay can be implemented using an electronics delay in the detector 230 of LIBS 100. Detector 230 may include any detector known in the art such as a CCD (or other detector element such as an avalanche photodiode or photomultiplier tube), that acquires the intensity data during an optimal time range. In the described example, after the actual laser pulse generates the super continuum plasma that decays over a delay period (typically ~100 ns) plasma signals related to the chemical elements become prominent and those useful signals are then acquired with a CCD detector. However, in some cases there is an effect due to a time difference between the timing of an expected laser pulse and the timing of an actual laser pulse, the result is a timing difference of the opening of the acquisition window where just a matter of nanoseconds can have a substantial impact on the data which can be particularly importation for quantification applications. For instance, opening the acquisition window early means an increase in noise if reading part of the super continuum, or opening the acquisition window late results in loss of valuable signal information related to one or more of the chemical elements.

In the same or alternative embodiments of the described invention, LIBS 100 may include variable filter 210 moveably positioned in the path of beam 250 between laser 205 and the sample. In the described embodiments filter 210 is under operational control of processor 220 (e.g. via one or more motors) and enables precise control of the degree of laser power delivered to a sample by absorbing a discrete amount of the laser power based upon the relative position of the variable filter with beam 250. For example, as those of ordinary skill in the related art appreciate a variable filter (also sometimes referred to as a graduated neutral density filter) includes a variety of possible optical filter arrangements that reduce or modify the intensity of light based upon a relative position of the variable filter with respect to the path of beam 250. Variable filters typically have a plurality of regions each having a particular degree of attenuation. Variable filters may be configured in a linear, circular, or other format known in the art some and embodiments may include various "transition" properties (also sometimes referred to as "edges") that may include smooth transitions (e.g. a soft edge) or sharp transitions (e.g. a hard edge) that separate degrees of the attenuation property of the variable filter.

In the described embodiments, the variable filers may include a range from unfiltered (e.g 100% transmission) to completely filtered (e.g. 0% transmission). Also, typical embodiments of LIBS 100 would be calibrated for a given laser power and the attenuator system of filter 210 could be used to maintain the calibrated level of laser power delivered to a sample in operation. For example, as described elsewhere detector 215 could detect the power of beam 250 as it exits variable filter 210 and adjust the position of the filter relative to beam 250 based upon a degree of detected laser power. Also, in some embodiments a temperature measurement may be taken using temperature detector 225 that processor 220 correlates with a known degree of change in laser power output and subsequently adjusts the position of variable filter 210 to compensate for the degree of change in laser power output.

Figure 8:
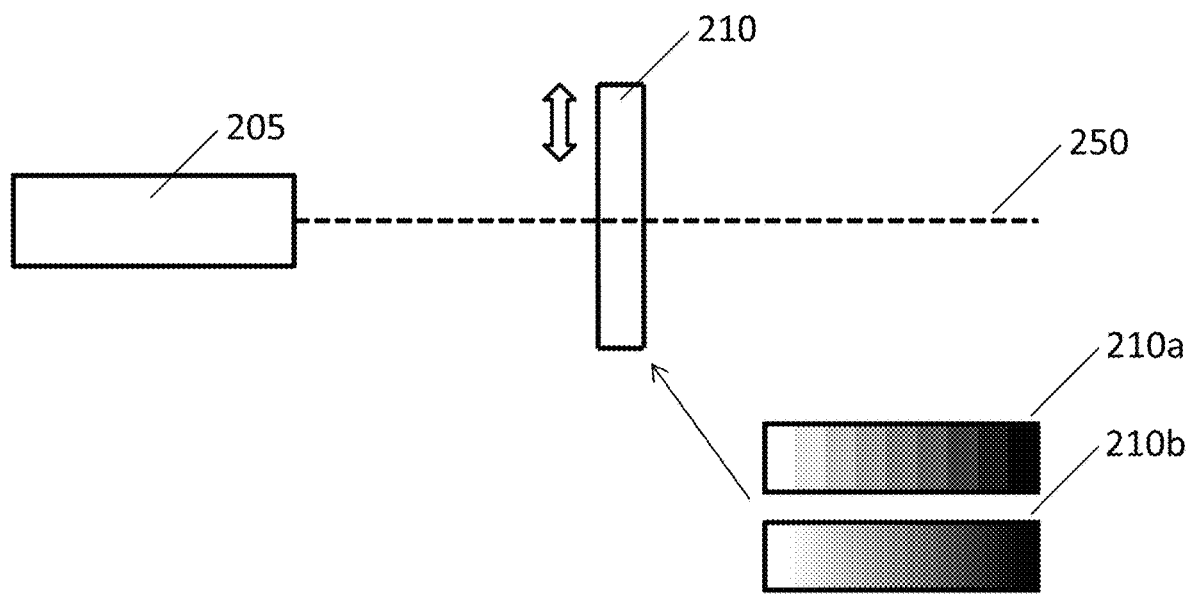
FIG. 8 is a simplified graphical representation of one embodiment of a attenuator system.
Figure 9:
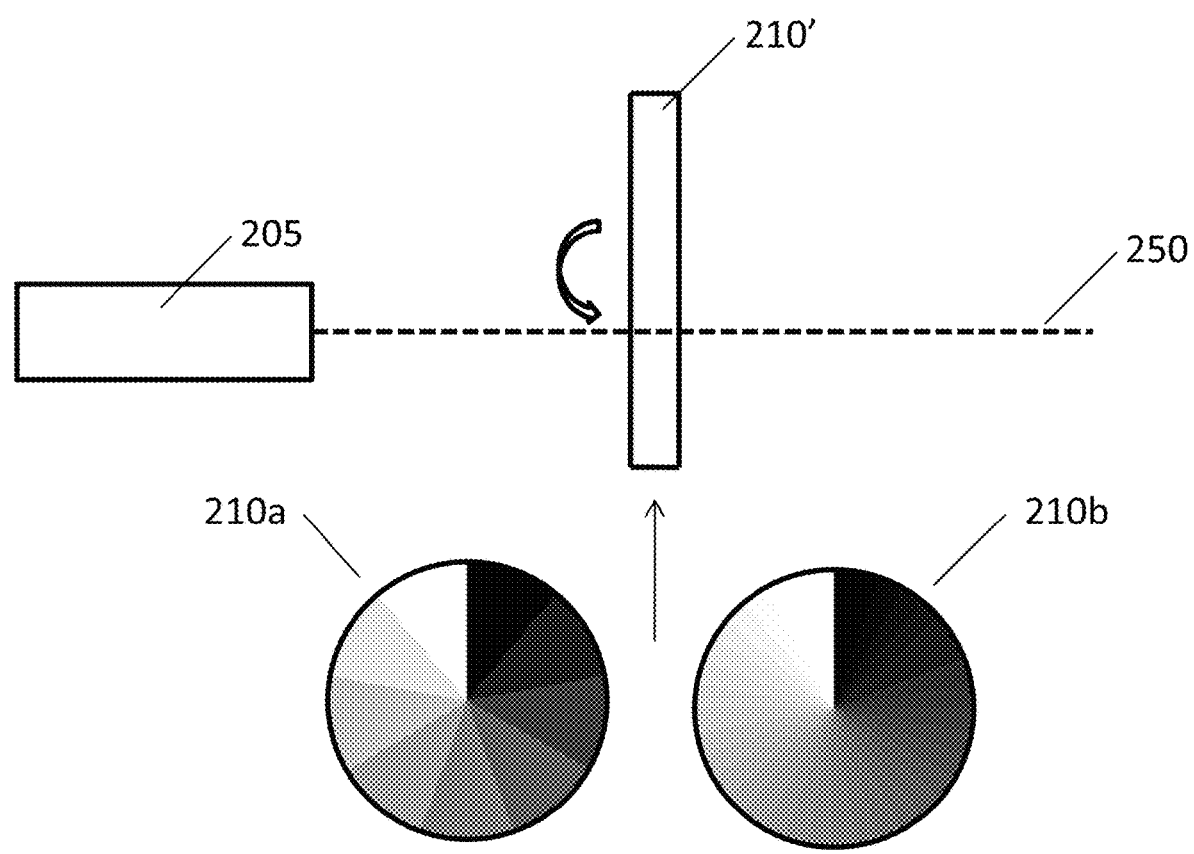
FIG. 9 is a simplified graphical representation of one embodiment of an attenuator system.
Figure 10:
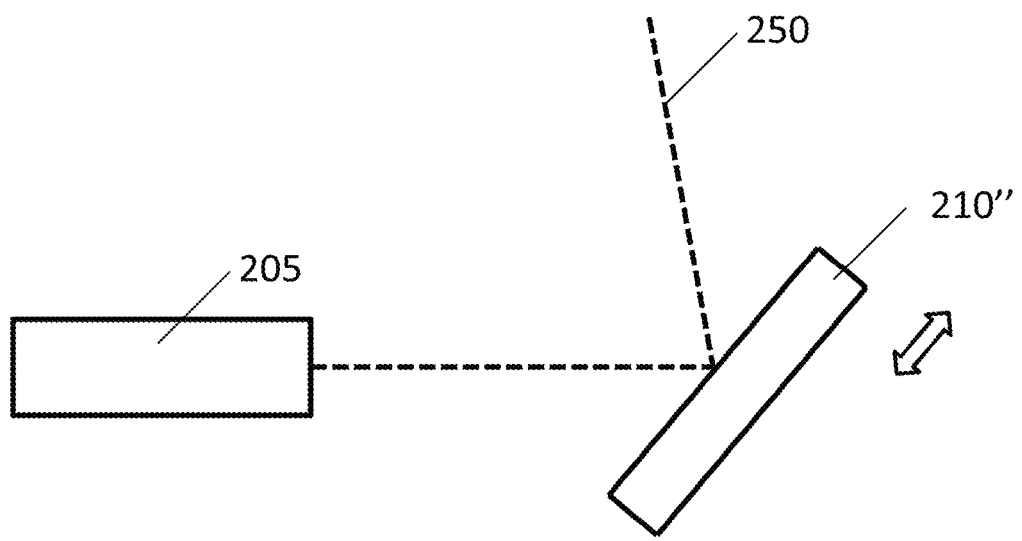
FIG. 10 is a simplified graphical representation of one embodiment of an attenuator system.
Figure 11:
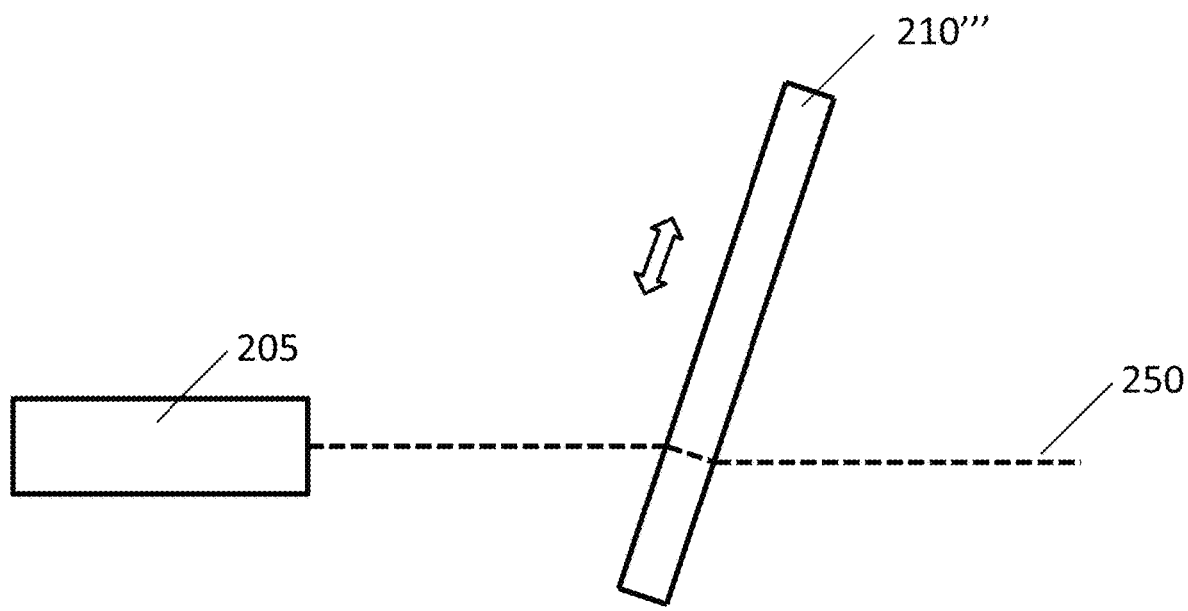
FIG. 11 is a simplified graphical representation of one embodiment of an attenuator system.
Figure 12:
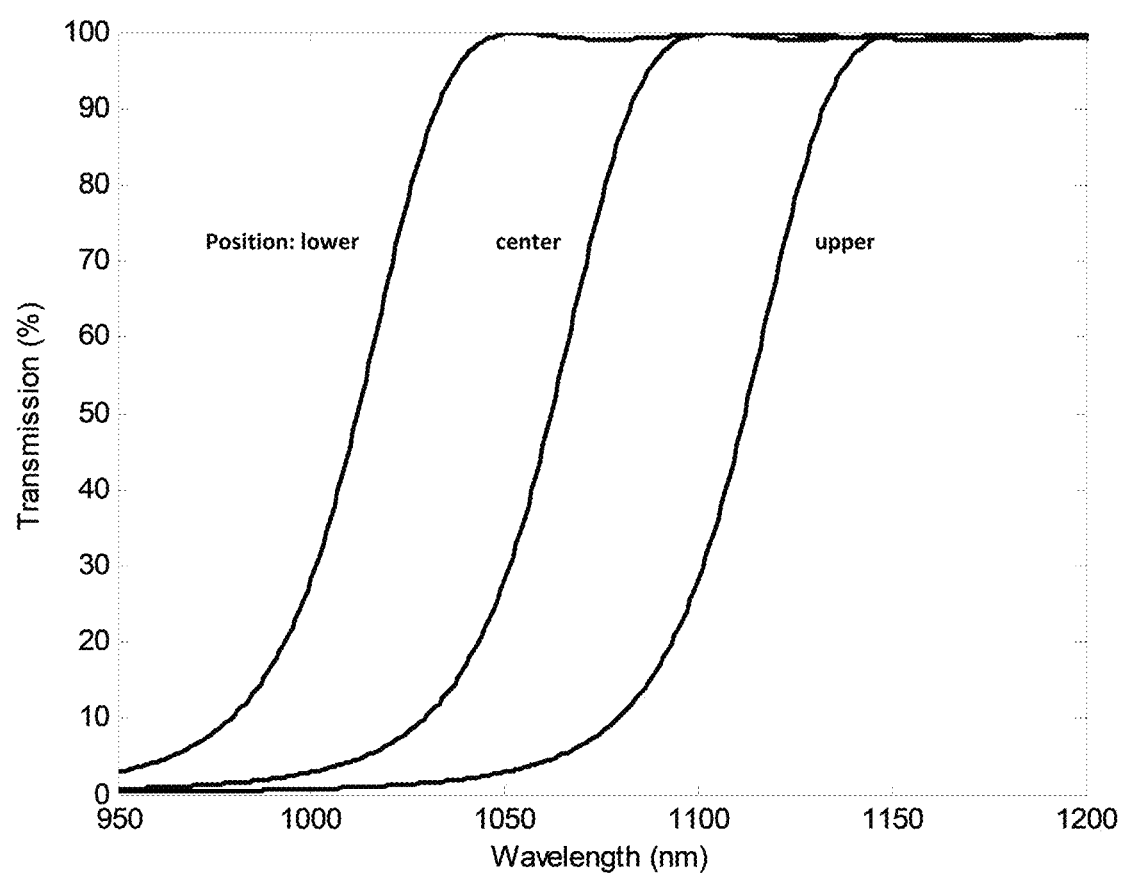
FIG. 12 is a simplified graphical representation of one embodiment of transmission data through the attenuator system of FIG. 11.
Figure 13:
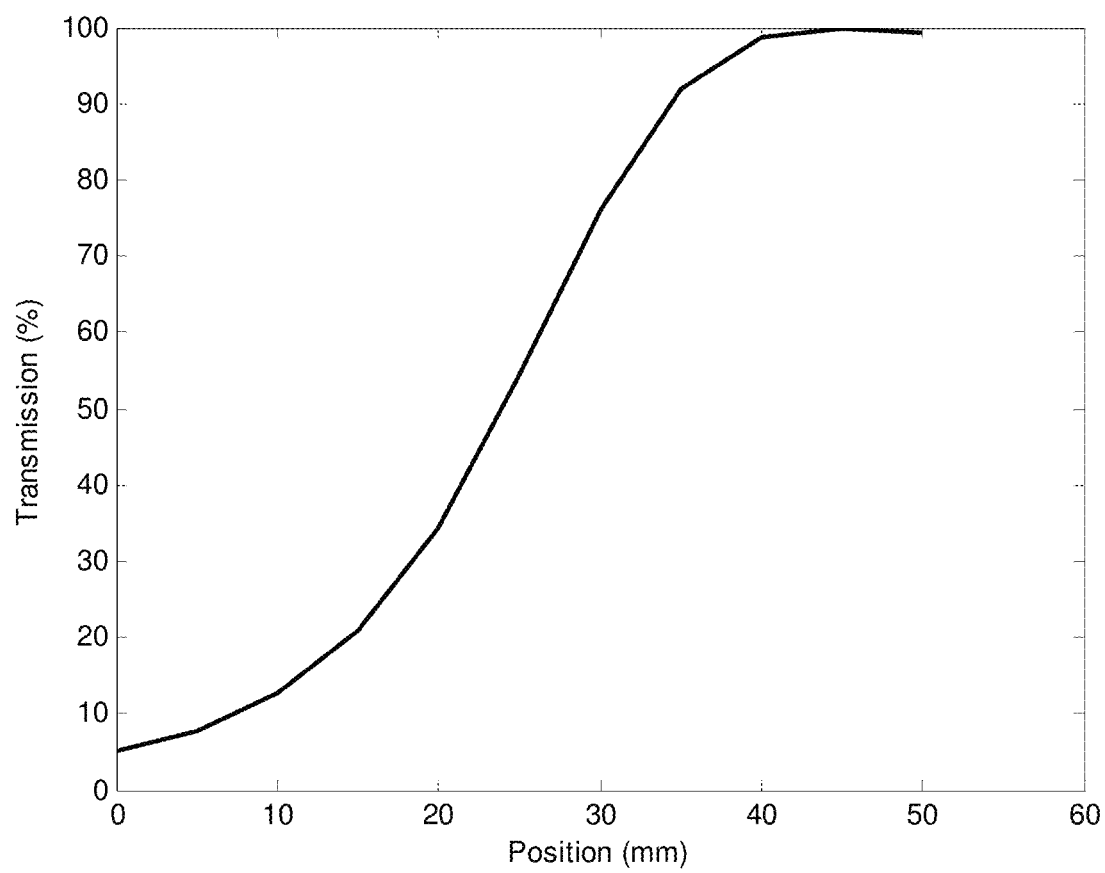
FIG. 13 is a simplified graphical representation of one embodiment of transmission data through the attenuator system of FIG. 11.

FIGS. 8-11 provide illustrative examples of embodiments of an attenuator system that include laser 205 that produces beam 250, and variable filter 210 (e.g. sliding variable neutral density filter), 210' (e.g. rotating variable neutral density filter), 210"(e.g. sliding variable reflector), and 210''' (e.g. sliding variable edge filter). FIGS. 8 and 9 also illustrate the different transition properties of the neutral density filters as hard edge step 210*a* and soft edge continuous 210*b*. Also FIGS. 12 and 13 provide illustrative examples of filter spectra and 1064 nm transmission through edge filter 210''' of FIG. 11.

Figure 14:
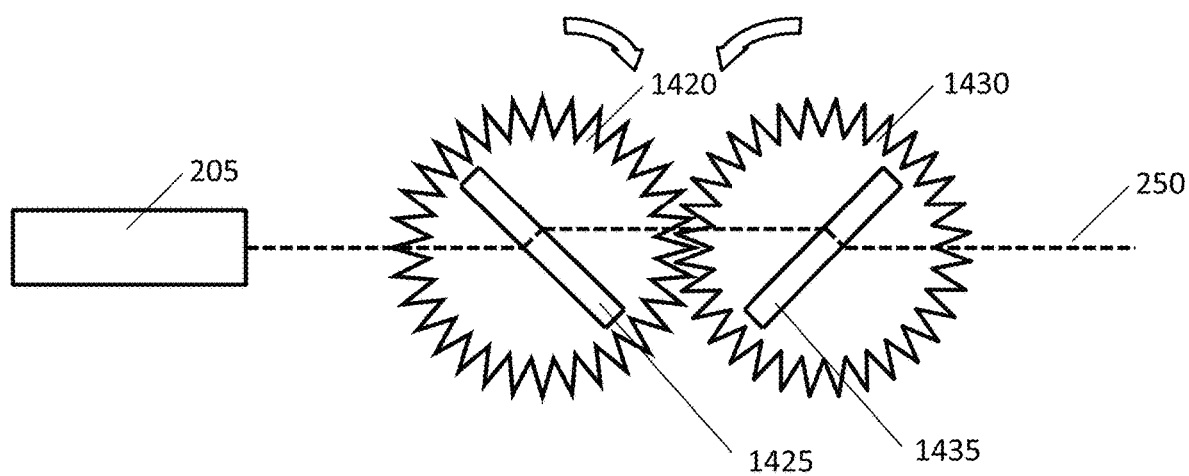
FIG. 14 is a simplified graphical representation of one embodiment of an attenuator system.
Figure 15:
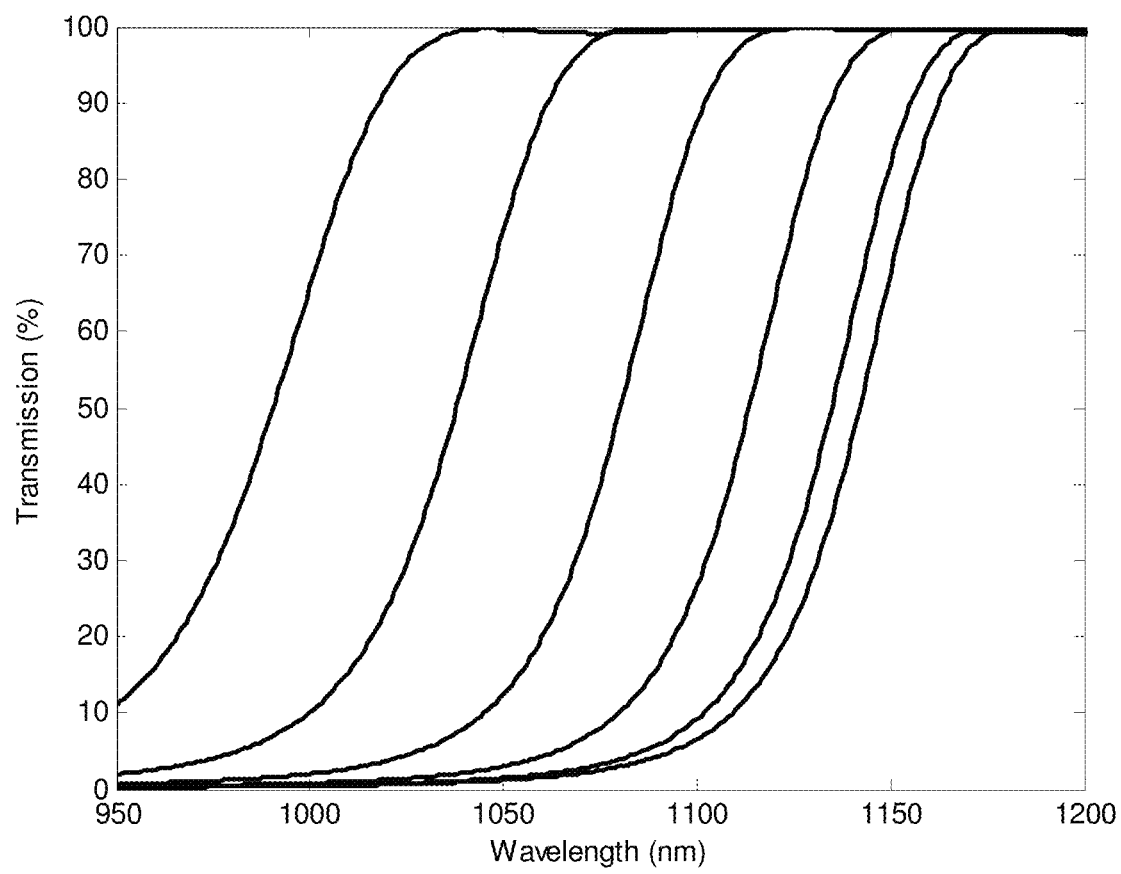
FIG. 15 is a simplified graphical representation of one embodiment of transmission data through the attenuator system of FIG. 14.
Figure 16:
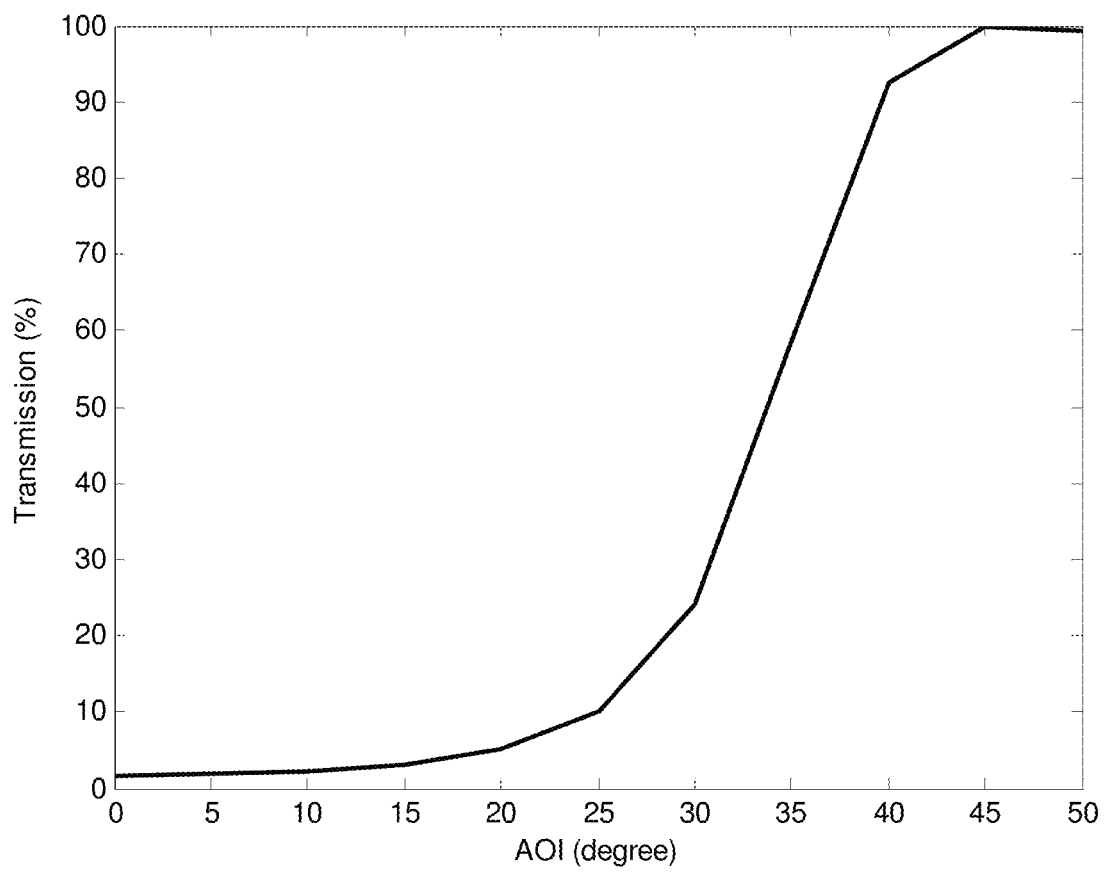
FIG. 16 is a simplified graphical representation of one embodiment of transmission data through the attenuator system of FIG. 14.

FIG. 14 provides yet another illustrative example of an embodiment of an attenuator system that includes laser 205 that produces beam 250, and variable filter rotation plate 1420 comprising rotating variable filter 1425 with coupled rotation plate 1430 comprising beam displacement compensator 1435 (e.g. with anti-reflective coatings). Also FIGS. 15 and 16 provide illustrative examples of filter spectra and 1064 nm transmission through filter 525 and compensator 535 of FIG. 14.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiment.

What is claimed is:

1. A laser induced breakdown system, comprising:
   a portable device that comprises:
      a laser configured to produce a beam comprising a plurality of repeating pulses;
      one or more optical elements configured to direct the beam at a sample and collect emitted light from a plasma continuum;
      an optical detector configured to produce a plurality of signal values from the emitted light from the plasma continuum; and
      a processor configured to:
         a) open a first data acquisition window after a first delay period and a second data acquisition window after a second delay period, wherein the first delay period begins upon production of one of the pulses;
         b) obtain a plurality of signal values from the first data acquisition window and a plurality of signal values from the second data acquisition window;
         c) calculate a differential value between one or more of the signal values from the first data acquisition window and the corresponding signal values from the second data acquisition window;
         d) select one of the first or second data acquisition windows based on the differential value; and
         e) identify a material from the signal values of the selected data acquisition window.

2. The laser induced breakdown system of claim 1, further comprising:
   a second optical detector that detects a time point of an actual pulse from the laser.

3. The laser induced breakdown system of claim 1, wherein:
   the first data acquisition window and the second data acquisition window comprise different durations of time.

4. The laser induced breakdown system of claim 1, wherein:
   the first data acquisition window and the second data acquisition window comprise overlapping durations of time.

5. The laser induced breakdown system of claim 1, wherein:
   the first data acquisition window maximizes the data quality obtained from an ionic emission and the second data acquisition window maximizes the data quality obtained from an atomic emission.

6. The laser induced breakdown system of claim 1, wherein:
   the material comprises an element.

7. The laser induced breakdown system of claim 1, wherein:
   the material comprises a matrix material.

8. A method for identifying a material using a portable device, comprising:
   producing a beam from a laser comprising a plurality of repeating pulses;
   directing the beam at a sample;
   collecting emitted light in response to the beam;
   opening a first data acquisition window after a first delay period and a second data acquisition window after a second delay period, wherein the first delay period begins upon production of one of the pulses;
   obtaining a plurality of signal values from the emitted light collected during the first data acquisition window and a plurality of signal values from the emitted light collected during the second data acquisition window;
   calculating a differential value between one or more of the signal values from the first data acquisition window and the corresponding signal values from the second data acquisition window;
   selecting one of the first or second delay periods based on the differential value; and
   identifying a material from the signal values of the selected data acquisition window.

9. The method of claim 8, further comprising:
   detecting a time point of an actual pulse from the laser.

10. The method of claim 8, wherein:
    the first data acquisition window and the second data acquisition window comprise different durations.

11. The method of claim 8, wherein:
    the first data acquisition window and the second data acquisition window comprise overlapping durations.

12. The method of claim 8, wherein:
    the first data acquisition window maximizes the data quality obtained from an ionic emission and the second data acquisition window maximizes the data quality obtained from an atomic emission.

13. The method of claim 8, wherein:
    the material comprises an element.

14. The method of claim 8, wherein:
    the material comprises a matrix material.

* * * * *